United States Patent
Berkas et al.

(10) Patent No.: US 11,470,051 B1
(45) Date of Patent: Oct. 11, 2022

(54) SECRET USER ACCOUNT

(71) Applicant: Meta Platforms, Inc., Menlo Park, CA (US)

(72) Inventors: Laycee Berkas, Freemont, CA (US); Elizabeth Inglese, San Francisco, CA (US); Tyler Bradin Gross, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 167 days.

(21) Appl. No.: 16/905,823

(22) Filed: Jun. 18, 2020

(51) Int. Cl.
*H04L 9/40* (2022.01)

(52) U.S. Cl.
CPC .................. *H04L 63/0421* (2013.01)

(58) Field of Classification Search
CPC .................................................. H04L 63/0421
USPC ........................................................... 726/26
See application file for complete search history.

(56) References Cited

U.S. PATENT DOCUMENTS

| | | |
|---|---|---|
| D183,256 S | 7/1958 | Green |
| D195,252 S | 5/1963 | Nikolich |
| D546,334 S | 7/2007 | Seo et al. |
| D574,391 S | 8/2008 | Kwag |
| D603,421 S | 11/2009 | Ebeling et al. |
| D604,325 S | 11/2009 | Ebeling et al. |
| D612,861 S | 3/2010 | Lee |
| D650,790 S | 12/2011 | Jeans et al. |
| D667,423 S | 9/2012 | Nagamine |
| D669,486 S | 10/2012 | Gam et al. |
| D675,229 S | 1/2013 | Frost et al. |
| D676,671 S | 2/2013 | Lee |
| D697,931 S | 1/2014 | Lee et al. |
| D697,932 S | 1/2014 | Lee et al. |
| D697,939 S | 1/2014 | Lee et al. |
| D725,666 S | 3/2015 | Tseng et al. |
| D740,314 S | 10/2015 | Oh et al. |
| D755,847 S | 5/2016 | Butcher et al. |
| D765,728 S | 9/2016 | Hung |
| D785,027 S | 4/2017 | Dye et al. |
| 9,681,099 B1 * | 6/2017 | Deets, Jr. ............... H04N 7/147 |

(Continued)

OTHER PUBLICATIONS

Office Action for U.S. Appl. No. 29/738,690, dated Feb. 8, 2022, Berkas, "Display Screen Having a Graphical User Interface or Portion Thereof ", 6 pages.

(Continued)

*Primary Examiner* — Michael S McNally
(74) *Attorney, Agent, or Firm* — Lee & Hayes, P C.

(57) ABSTRACT

Techniques are described that enable a user to create and use a secret user account on a social networking system that is undiscoverable by other user accounts unless invited to interact by the secret account. In some cases, a social networking system receives a request to create a secret account, and creates the secret account. The social networking system may provide, in association with the secret account, account settings for the secret account that cause the social networking system to exclude the secret account from search results on the social networking system, and obscure activity by the secret account from a first user account. The social networking system may cause presentation of a control in a user interface associated with the secret account to invite a second user account to interact with the secret account.

20 Claims, 7 Drawing Sheets

(56) References Cited

U.S. PATENT DOCUMENTS

| | | | |
|---|---|---|---|
| D798,893 S | 10/2017 | Anzures et al. | |
| D819,658 S | 6/2018 | Han et al. | |
| D831,673 S | 10/2018 | O'Rourke et al. | |
| D831,689 S | 10/2018 | Matas | |
| D845,992 S | 4/2019 | Davis et al. | |
| 2008/0256602 A1* | 10/2008 | Pagan | H04L 63/102 726/3 |
| 2009/0030985 A1* | 1/2009 | Yuan | H04L 67/306 709/204 |
| 2011/0213975 A1* | 9/2011 | Sorniotti | G06Q 10/107 713/169 |
| 2013/0007149 A1* | 1/2013 | Harris | G06Q 10/10 709/206 |
| 2013/0125026 A1* | 5/2013 | Gaume | G06Q 10/10 715/753 |
| 2015/0264094 A1* | 9/2015 | Huang | H04L 67/02 709/204 |
| 2016/0057154 A1* | 2/2016 | Ferguson | H04L 63/104 715/741 |
| 2016/0253710 A1* | 9/2016 | Publicover | G06Q 30/0269 705/14.66 |
| 2018/0336644 A1 | 11/2018 | Albertine et al. | |
| 2018/0348966 A1 | 12/2018 | Scoville et al. | |
| 2021/0382724 A1 | 12/2021 | Rudin et al. | |

OTHER PUBLICATIONS

Egorov, "Star icons Twinkling stars. Sparkles, shining burst. Christmas vector symbols isolated. Xmas sparkle star, asterisk, pointed twinkling silhouette illustration," Alamy Stock Vector, https://www.alamy.com/star-icons-twinkling-stars-sparkles-shining-burst-christmas-vector-symbols-isolated-xmas-sparkle-star-asterisk-pointed-twinkling-silhouette-illustration-image357379752.html, Sep. 27, 2018, 1 page.

Egorov, "White twinkling vector stars isolated on dark background. Shining glitter star icons, set illustration," Alamy Stock Vector, https://www.alamy.com/white-twinkling-vector-stars-isolated-on-dark-background-shining-glitter-star-icons-set-illustration-image344368038.html, Sep. 19, 2016, 1 page.

Whitney, "How to Create and Manage Multiple Twitter Accounts", retrieved at <<https://uk.pcmag.com/gallery/119412/how-to-create-and-manage-multiple-twitter-accounts?p=1#:~:text=0pen%20the%20app%20and%2osign,as%20much%20you%20want>>, 2019, 17 pgs.

AllDesignCreative, Youtube, "Shining Stars Animated Black Background Effect", https://www.youtube.com/watch?v=K_SEBswY5ys&list=P L4tYmy08nAU uzo 1 ka Rmm-kP81e 1 g R3zCQ&index=65, Dec. 12, 2016, 1 page.

Anfx, Youtube, "Sparkle Glitter #1—4K Green screen Free high quality effects," https://www.youtube.com/watch?v=bt0aP5XJRGg, Aug. 26, 2017, 1 page.

* cited by examiner

SECRET USER ACCOUNT

BACKGROUND

Social networking systems allow users to connect with each other by sharing events, sharing content such as photos and videos, and sharing interests. Users are continually searching for ways to express themselves, and connect with communities of other users having similar interests. Therefore, social networking systems continue to provide users with increasing options for content sharing that allow users to connect with one another. In some cases, users may want to control how much content, and what content about themselves, is shared on a social networking system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
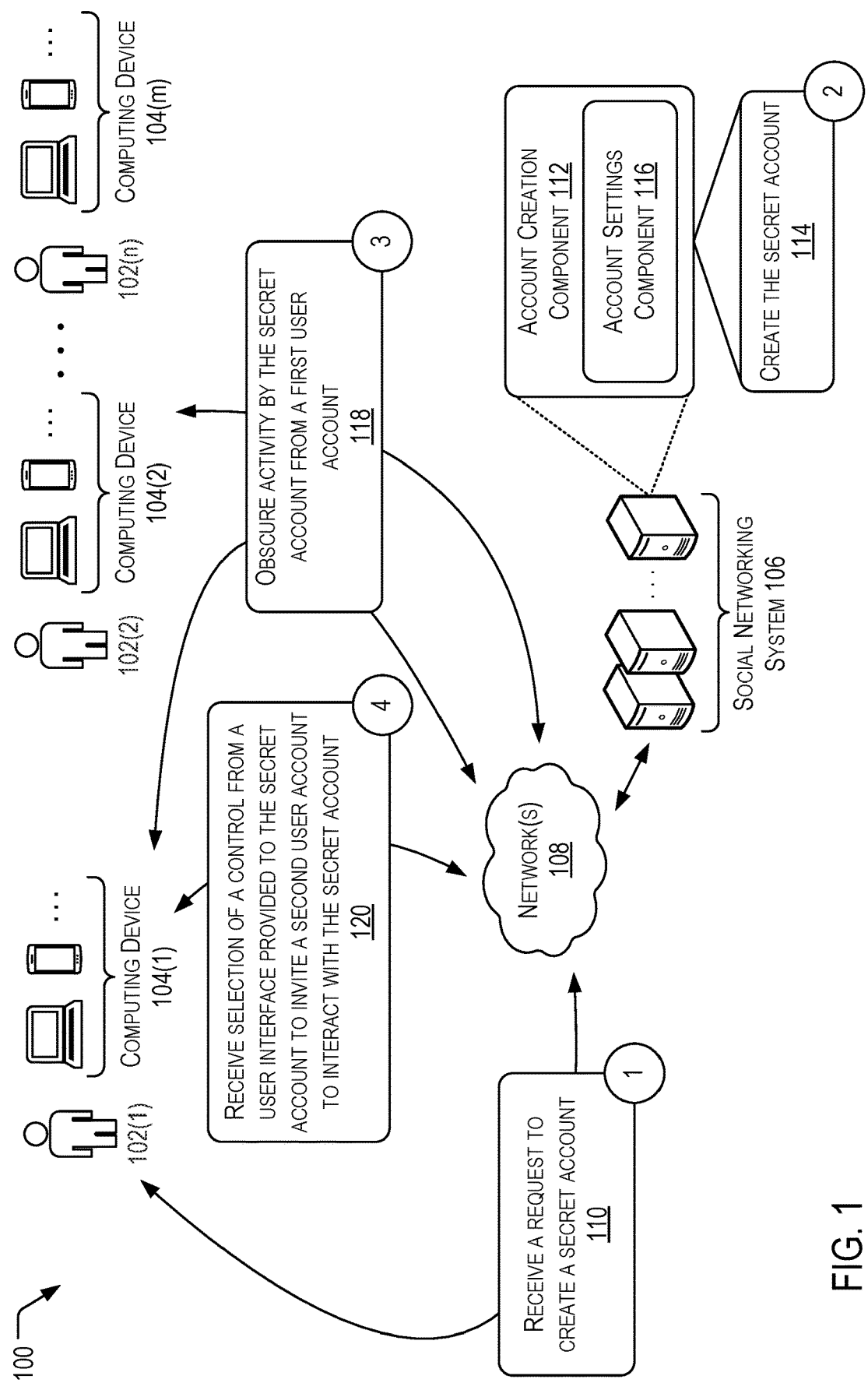
FIG. 1 is a schematic view of an example system usable to implement example techniques for using a secret user account on a social networking system as described herein.

As discussed above, social networking systems continue to develop fun and unique ways for users to connect with each other, such as based on shared interests of different users. In some cases, however, users may want limit what information is visible to other users on a social networking system. For instance, some users may be reluctant to use a social networking system if they were able to be discovered by other users on the social networking system. In an illustrative example, a user may forego using a social networking system if the user thinks a person who has bullied them would be able to find them on the social networking system. Conventional systems often make user accounts discoverable in some way, such as via a search by another user. Therefore, conventional systems do not provide an option for users who may want to access functionality of a social networking system, but do not want to be discovered by other users on the social networking system.

This application describes techniques for creating and using a secret account on a social networking system and/or service (herein referred to as a "social networking system"). The secret account may not be discoverable by other user accounts on the social networking system, but may provide the ability to reach out to other user accounts to connect with the secret account on the social networking system. Once a connection with another user account has been initiated by the secret account on the social networking system, the other user account may be able to interact with the secret account, such as by viewing content items shared by the secret account, providing feedback on content items shared by the secret account, messaging with the secret account, and the like.

Various embodiments of the present disclosure include systems, methods, and non-transitory computer-readable media of a social networking system.

For instance, in one example, a social networking system may operate a service that corresponds to a dedicated application installed on a user device or an application that is accessible via a browser installed on the user device. The social networking system may enable users to share content via the application. In some cases, the shared content may be accessed (e.g., viewed) by devices associated with other users that also have the application installed on, or that access the application via, their respective devices. The social networking system may store account information associated with each user and the respective device on which the application is installed or which is used to access the application.

In some examples, the social networking system may receive a request to create a secret account on a social networking system. The social networking system may create the secret account, and provide, in association with the secret account on the social networking system, account settings for the secret account. In some examples, the account settings may comprise excluding the secret account from search results on the social networking system, and obscuring activity by the secret account on the social networking system from a first user account. For instance, the first user account may be a user account that has not been invited by the secret account to interact with the secret account. In some examples, the social networking system also causes presentation of a control in a user interface associated with the secret account to invite a second user account to interact with the secret account. In this way, the secret account can initiate interaction with other user accounts, and is not discoverable by other user accounts unless the secret account has initiated interaction.

In some examples, the social networking system receives, from the first user account (e.g., the user account that has not received an invitation to interact from the secret account), a search input comprising a username associated with the secret account or a name supplied by a user that requested to create the secret account. The social networking system provides the search results to the first user account that exclude the secret account. Thus, even when the first user account knows the username of the secret account or a name of a user that created the secret account, the social networking system will not divulge or acknowledge the existence of the secret account unless the secret account has initiated interaction with the account performing the search.

In some examples, the account settings further comprise excluding the secret account from suggestions of accounts to follow that are presented to the first user account. This provides another mechanism by which the social networking system prevents the first user account from discovering the presence of the secret account.

In some examples, the social networking system receives a first selection of the control to invite the second user account to interact with the secret account. The social networking system provides a list of suggested user accounts to the secret account, where the list includes the second user account. In some cases, the list of suggested user accounts may be based on user accounts that follow a user account that the secret account is already connected with, based on connections that the user has with a different account (e.g., a public account or private account) on the social networking system, based on a contact list from a different application (e.g., a contact list from a different social networking application or service, an email contact list, a phone number contact list, etc.), and the like. In examples, the social networking system receives, from the secret account, a second selection of the second user account to interact with the secret account, and sends an invitation to the second user account requesting that the second user account connect with the secret account on the social networking system. The social networking system may receive an acceptance of the invitation from the second user account, and cause content shared by the secret account on the social networking system to be accessible to the second user account. Thus, once the second user account has accepted the secret user account's invitation to interact, the second user account can view content items shared by the secret account, provide feedback on content items shared by the secret account, send messages to the secret account, and so forth.

In some examples, the request is received from a first application associated with the social networking system, such as a social network application on a computing device associated with a user that created the secret account. The social networking system may receive a selection of the control to invite the second user account to interact with the secret account. The social networking system may cause a second application independent of the first application to send an invitation to the second user account requesting that the second user account connect with the secret account on the first application. For instance, the second application may be a text messaging application, an encrypted messaging application, an email application, or the like, and the invitation may be a message that includes a link to accept the invitation on the first application. The social networking system may receive an acceptance of the invitation from the second user account, and cause content shared by the secret account on the social networking system to be accessible to the second user account on the first application. Providing the secret account with the ability to send invitations to connect on other applications may provide additional privacy for the secret account, and/or access to contacts that the secret account may not have on the social networking application.

In some examples, the social networking system may provide a visual indicator, in the user interface associated with the secret account, that the secret account is currently active. For instance, the visual indicator may provide a reminder to a user that the actions they are performing on the social networking system are obscured from accounts that the secret account is not connected with on the social networking system.

In some examples, the request to create the secret account may be a first request, and the control to invite the second user account may be a first control. The social networking system may receive a second request from the secret account to switch from the secret account to a different account type (e.g., a public account, a private account, etc.), where the different account type is discoverable by the first user account, such as by searching for a username or name associated with the user that created the secret account. A user may want to switch from the secret account to a different account type to access functionality that may be disabled for the secret account, such as leaving feedback on content items shared by other user accounts, for instance. The social networking system may switch the secret account to the different account type. In some examples, the social networking system may determine that a predetermined amount of time has passed since the secret account switched to the different account type. Responsive to determining that the predetermined amount of time has passed, the social networking system may provide a second control to return to the secret account from the different account type. In this way, the social networking system may prevent malicious switching between account types, such as leaving bullying comments using a discoverable account, then switching to a secret account to avoid repercussions of the bullying comment.

In some examples, the control to invite the second user account may be a first control, and the social networking system may receive, from the second user account, a content item to share via the social networking system. The social networking system may provide the content item to the first user account with a second control that, when selected, causes the first user account to provide feedback to the second user account associated with the content item. The social networking system may provide the content item to the secret account without the control, thus preventing the secret account from providing feedback on the content item that may be visible to other user accounts that the secret account has not invited to interact with.

In some examples, the social networking system may receive, from the secret account, feedback on a content item shared by the second user account. The social networking system may provide the feedback to the second user account, but may obscure one or more of the feedback from the first user account, or an identifier of the secret account in association with the feedback, from the first user account. Therefore, user accounts that the secret account has invited to interact with can view feedback provided by the secret account, while the social networking system obscures user accounts that the secret account has not invited to interact from discovering the secret account.

In some examples, the social networking system receives, from the second user account, a content item to be shared by the second user account with at least the first user account. The content item may include a tag that identifies the secret account, such as a tag in an image or video, a mention in a caption, or the like. The social networking system may obscure the tag that identifies the secret account from the first user account by one or more of displaying the content item without the tag to the first user account, or obfuscating (e.g., blurring, redacting, or omitting) an identifier of the secret account in the tag as part of the content item when displayed to the first user account.

In this way, the social networking system provides users with the ability to create and use a secret user account without being discovered by other user accounts on the social networking system. The social networking system may prevent users from searching for and detecting activity by the secret user account, so that without an invite to interact from the secret user account, it appears that the secret user account does not exist on the social networking system. The social networking system enables the secret account to extend invitations to other user accounts to interact, thus giving the secret account control over who can see and interact with the presence of the secret account.

These and other aspects are described further below with reference to the accompanying drawings. The drawings are merely an example implementation and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to facilitate creation and use of a secret account for a social networking system, such as on an application via the system 100. In some examples, the system 100 may include users 102(1), 102(2), . . . 102(n) (collectively "users 102") to interact using computing devices 104(1), 104(2), . . . 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 one or more user accounts associated with the user. The user account(s) may include demographic information, communication-channel information, financial information and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to facilitate creation and use of secret accounts by the users 102 via the computing devices 104.

For example, at operation 110 (indicated by "1"), an account creation component 112 of the social networking system 106 may receive a request to create a secret account on the social networking system 106. In some examples, the account creation component 112 may be part of a social network service (e.g., Facebook®, Instagram®, etc.), although other examples of services are also considered. The request may include a username to associate with the secret account that identifies activities (e.g., posts, comments, likes, etc.) performed by the user 102(1) on the social networking system 106 using the secret account. However, as discussed in more detail below, the username associated with the secret account may be obscured in association with activities performed using the secret account on the social networking system 106 from other users 102(2)-102(n) who have not been invited to interact with the secret account.

At operation 114 (indicated by "2"), the account creation component 112 creates the secret account on the social networking system 106. Additionally, in examples, an account settings component 116 of the account creation component 112 provides account settings for the secret account on the social networking system 106. In some cases, the account settings component 116 may prevent the secret account from being discovered by other user accounts associated with the users 102(2)-102(n) if the other user accounts have not been invited by the secret account to interact on the social networking system. For example, the account settings component 116 may cause the social networking system 106 to exclude the secret account from search results on the social networking system 106, such as in response to a search performed by one of the other users 102(2) who has not been invited by the secret account to interact. For instance, the social networking system 106 may receive a search input from the user 102(2) that includes the username provided by the user 102(1) for the secret account, and/or a name supplied by the user 102(1) that requested to create the secret account. In response to receiving the search input, the social networking system 106 may identify that the secret account matches the search input, but nonetheless provide search results to the user 102(2) that exclude the secret account. Alternatively or additionally, the social networking system 106 may be excluded from a corpus of account information (e.g., usernames, names provided by users who create user accounts, etc.) that are used to populate search results. For example, the social networking system 106 may provide search results that include other user accounts (e.g., public user accounts) that have a username similar to the search input.

At operation 118 (indicated by "3"), the account settings component 116 causes the social networking system 106 to obscure activity by the secret account from a first user account, which may be associated with the user 102(2). In some examples, the account settings component 116 may cause the social networking system 106 to prevent actions taken by the secret account, such as sharing content items on the social networking system 106, providing feedback on content items shared on the social networking system 106, and the like from being visible to users, such as the user 102(2), associated with the accounts that have not been invited to interact with the secret account. In some cases, the social networking system 106 may present suggestions of other user accounts to follow to the first user account, such as a user account that shares common followers with the first user account, a trending user account, a user account that shares content items in a multi-author story (e.g., via a hashtag "#" followed by a text string associated with the multi-author story) that the first user account also shares content items with, and so forth. The account settings component 116 may cause the social networking system 106 to exclude the secret account from suggestions of other user accounts for the first user account to follow, even if the secret account shares common followers with the first user account, is a trending user account, and/or shares content items in a multi-author story that the first user account also shares content items with, to name a few examples.

In some examples, the account settings component 116 may control how often the user 102(1) can switch from the secret account to a different account type (e.g., a public account, a private account, etc.) on the social networking system 106. In some cases, users may want to use the secret account functionality in a malicious way, such as by bullying another user by leaving a mean comment using a public account on the other user's content post, then switching to the secret account to become undiscoverable and try to avoid consequences of the bullying. To prevent rapid switching between the secret account and different account types, the account settings component 116 may require that the user 102(1) wait a predetermined amount of time (e.g., one day, three days, one week, etc.) before switching back to a secret account from a different account type.

For instance, the social networking system 106 may receive a request from the secret account to switch from the secret account to a different account type that is discoverable by the first user account (e.g., the user account associated with the user 102(2) that has not received an invite to interact with the secret account). The different account type may be discoverable by the first user account using a search for a username or name provided by the user 102(1) when the secret account was created, in a list of suggested user accounts to follow, viewing content items or feedback shared by the different account type, and so forth. The social networking system 106 may switch the secret account to the different account type, and store a time at which the switch to the different account type was made.

The social networking system 106 may prevent the user 102(1) from switching back to the secret account by, for instance, withholding a control in a user interface to switch back to the secret account type for a predetermined amount of time following the time at which the switch to the different account type was made. In examples, the social networking system 106 may determine that the predetermined amount of time (e.g., one day, three days, one week, etc.) has passed since the secret account has switched to the different account type. Based on determining that the predetermined amount of time has passed, the social networking system 106 may provide the control that, when selected by the user 102(1), causes the account type to return from the different account type back to the secret account.

Other examples of controlling switching from the secret account to a different account type and back are also considered. For instance, the social networking system 106 may limit a number of times that the secret account can switch to the different account type and back (e.g., three times, five times, twenty times, etc.). Alternatively or additionally, the social networking system 106 may increase an amount of time before the control is presented to switch back to the secret account from the different account type (e.g., the control is withheld for one additional day, three additional days, etc. each time the user switches), and so forth.

Additionally, in some cases, the account settings component 116 may provide an instruction to the computing device 104(1) of the user 102(1) to display a visual indicator in a user interface to indicate that a secret account is currently active. Examples of visual indicators may include, but are not limited to, a shimmer or holographic pattern that appears when the user 102(1) moves the computing device 104(1), a different background color in the user interface, a different text color in the user interface, an icon, an animation, and so on. The visual indicator may provide a reminder to a user that the actions they are performing on the social networking system 106 are obscured from accounts that the secret account is not connected with on the social networking system.

At operation 120 (indicated by "4"), the social networking system 106 receives selection of a control in a user interface provided to the secret account to invite other user accounts, such as a second user account (e.g., a user account associated with the user 102(n)), to interact with the secret account. Accordingly, the secret account has control over which user accounts the secret account interacts with and are able to view activity by the secret account on the social networking system 106 via the invitation(s) to other user account(s). As described in more detail below in relation to FIG. 2, since other user accounts may not be able to discover the presence of the secret account on the social networking system 106, the other user accounts may not have the ability to invite the secret account to interact.

In some examples, the social networking system 106 may receive selection of the control by the user 102(1) to invite one or more other user accounts to interact with the secret account. The social networking system 106 may, in some cases, provide a list of suggested user accounts to the secret account of user accounts that the secret account may want to interact with, such as based on user accounts that follow a user account that the secret account is already connected with, based on a contact list from a different application (e.g., a different social networking application, an email contact list, a phone number contact list, etc.), based on connections that the user 102(1) has with a different account (e.g., a public account or private account) on the social networking system 106, and the like. The social networking system 106 may receive a selection from the user 102(1) of one or more other user accounts, such as the second user account associated with the user 102(n), to invite to interact with the secret account.

Based on receiving this selection of the second user account, the social networking system 106 may send an invitation to the second user account that requests the second user account connect with the secret user account on the social networking system 106. Therefore, the secret account initiates contact with other user accounts, such as the second user account, which may make the secret account known to other user accounts that the secret account invites to interact with. If the social networking system 106 receives an acceptance of the invitation from the second user account (e.g., the user 102(n) selecting an "accept friend request" control in a user interface), the social networking system 106 may cause activity by the secret account to be visible to the second user account. For example, the social networking system 106 may cause content shared by the secret account on the social networking system 106 to be accessible to the second user account via a content feed or search, may give the second user account permissions to send messages to the secret account via the social networking system 106, may give the second user account the ability to provide feedback (e.g., comments, likes, etc.) on content items shared by the secret account, and so forth.

In some cases, the social networking system 106 may invoke a different application on the computing device 104(1) to send an invitation to the second user account to connect with the secret account on the social networking system 106. As described above, the social networking system 106 may receive selection of the control by the user 102(1) to invite one or more other user accounts to interact with the secret account. The social networking system 106 may access another application on the computing device 104(1) that is independent of the social network application or web browser used to access the social networking system, such as a contacts or phone book application, a messaging application (e.g., SMS messaging, WhatsApp®, Facebook Messenger®, Slack®, etc.), or the like based on the selection. In some examples, the social networking system 106 may use contacts in the other application to suggest users (who may or may not have an account on the social networking system 106) for the secret account to interact with on the social networking system 106.

Based on receiving a selection of another user account, such as the second user account associated with the user 102(n), in the social networking system 106 may request that the other application send an invitation to the second user account to connect with the secret account on the social networking system 106. The invitation may be customized by the user sending the invitation or may be pre-populated. For instance, the invitation may include a link for the user 102(n) to access the social networking system 106 from the other application that received the invitation. The social networking system 106 may receive an acceptance from the user 102(n) of the invitation to connect with the secret account on the social networking system 106, and based on the acceptance, may cause activity by the secret account to be visible to the second user account as described above.

The account settings component 116 may control how the social networking system 106 obscures activity, such as interactions with user accounts the secret account is connected with, from other user accounts that the secret account has not invited to connect with. In some examples, the account settings component 116 may prevent the secret account from providing feedback (e.g., comments, likes, etc.) on content items shared by other user accounts, and/or control how the secret account provides such feedback. For instance, the social networking system 106 may receive a content item to be shared from the second user account associated with the user 102(n) that has been invited to interact with the secret account, where the second user account is a different account type than a secret account. In order to keep other user accounts, such as the first user account associated with the user 102(2), from discovering the presence of the secret account, the social networking system 106 may disable feedback functionality for the secret account while making the feedback functionality available to other accounts that the content item has been shared with.

For example, the social networking system 106 may provide the content item to the first user account associated with the user 102(2) with a control that, when selected, enables the first user account to provide feedback associated with the content item (e.g., comment, like, etc.) to the second user account. In some cases, the social networking system 106 may provide the content item shared by the second user account associated with the user 102(n) to the secret account without the control, however. Thus, the social networking system 106 prevents the secret account from providing feedback such as likes or comments that may be discoverable on the social networking system 106 by other user accounts that the secret account has not invited to interact with.

Alternatively or additionally, the social networking system 106 may provide a control that allows the secret account to provide feedback on content items shared by user accounts that the secret account has invited to interact with, but prevent other user accounts that the secret account has not invited to interact with from viewing the feedback by the secret account. Similar to the discussion above, the social networking system 106 may receive a content item to be shared from the second user account associated with the user 102(n) that has been invited to interact with the secret account, where the second user account is a different account type than a secret account. The social networking system 106 may receive feedback on the content item shared by the second user account via a control from the secret account, such as a like or a comment. The social networking system 106 may provide the feedback to the second user account so that the user 102(n) can view the feedback from the secret account.

However, in some cases, the social networking system 106 may obscure the feedback from the first user account associated with the user 102(2) that has not been invited to interact with the secret account, such as by excluding the username associated with the secret account from a list of user accounts that liked the content item, preventing a comment provided by the secret account from being displayed to the first user account, and so forth. Alternatively or additionally, the social networking system 106 may obscure an identifier of the secret account, such as a username or profile picture, in association with the feedback from the first user account. For instance, the first user account may be able to see a comment left by the first user account, but may not be able to see a username and/or profile picture associated with the account that left the comment. The social networking system 106 may obscure the identifier of the secret account by blurring, redacting, camouflaging, blocking out, omitting, or the like the username and/or profile picture.

In some examples, the second user account that is associated with the user 102(n) may identify the secret account in a content item shared by the second user account, such as by tagging the secret account in an image or video, in a caption, in a comment, and so on. For instance, friends and family often tag one another in images or video that include each other, users may tag one another to share content items posted by other user accounts, and users may tag one another to participate in giveaways, to name a few examples. To prevent the secret account from being discovered when tagged by a user account that the secret account has invited to interact with, the social networking system 106 may obscure the tag of the secret account from other user accounts that the secret account has not invited to interact with.

Similar to the discussion above, the social networking system 106 may receive a content item to be shared from the second user account associated with the user 102(n) that has been invited to interact with the secret account, where the second user account is a different account type than a secret account. The content item may include a tag, added to the content item by the second user account, of the secret account that identifies a username of the secret account. The social networking system 106 may obscure the tag that identifies the secret account from the first user account associated with the user 102(2) so that the secret account is not discoverable by the first user account via the tag.

For instance, the social networking system 106 may display the content item to the first user account without the tag. Alternatively or additionally, the social networking system 106 may obfuscate an identifier of the secret account, such as a username or profile picture, in the tag as part of the content item when displayed to the first user account. To illustrate, a comment left by the second user account may include a tag of the username of the secret account, where the first user account may see the comment but may not be able to see the username of the secret account. The social networking system 106 may obfuscate the identifier of the secret account by blurring, redacting, camouflaging, blocking out, omitting, or the like the username and/or profile picture.

In some examples, the social networking system 106 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Figure 2:
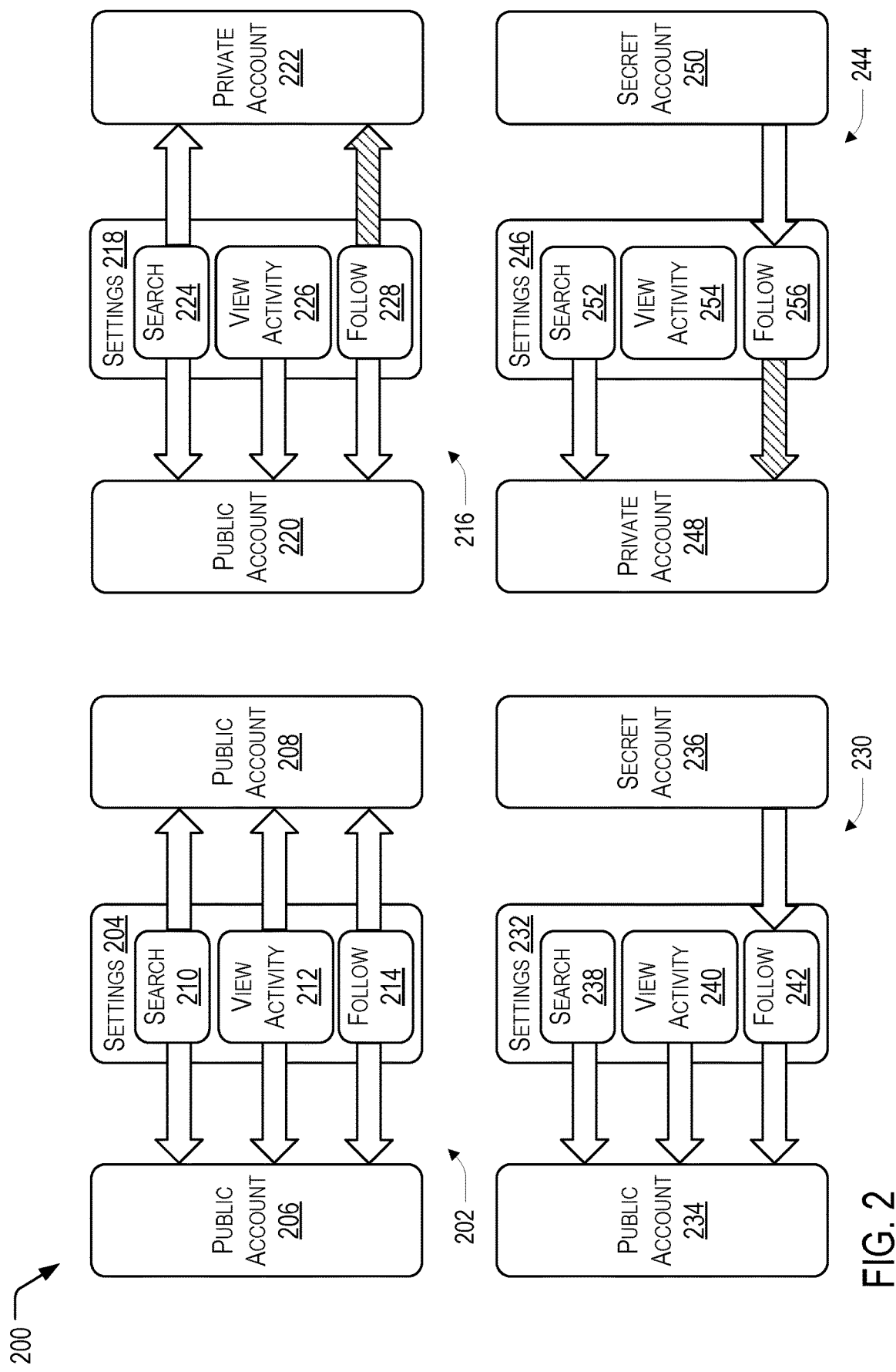
FIG. 2 depicts schematic illustrations of settings to control interactions between different account types, including a secret account, according to the techniques described herein.

FIG. 2 depicts schematic illustrations of settings 200 that may be used to control interactions between different account types, including a secret account, according to the techniques described herein. A first example 202 illustrates settings 204 that the account settings component 116 may use to control interactions between public accounts, such as a public account 206 and a public account 208, on the social networking system 106 of FIG. 1. In some examples, the public accounts may be one of the different account types described herein, other than the secret account.

The settings 204 include a search setting 210, a view activity setting 212, and a follow setting 214. The arrows extending from the search setting 210 indicate that the public account 206 can search for the public account 208 and the social networking system 106 will provide search results to the public account 206 that include the public account 208. Similarly, the arrows extending from the search setting 210 indicate that the public account 208 can search for the public account 206, and the social networking system 106 will provide search results to the public account 208 that include the public account 206.

The view activity setting 212 may control what is visible to the public account 206 and/or the public account 208 prior to the public account 206 connecting with, or following, the public account 208, and/or prior to the public account 208 connecting with, or following, the public account 206. The arrows extending from the view activity setting 212 indicate that the public account 206 can view activity by the public account 208 on the social networking system 106 such as content items shared by the public account 208 (e.g., images, videos, ephemeral content items, and the like), feedback (e.g., comments, likes, etc.) by the public account 208 on content items shared by other user accounts, and so forth. Similarly, the arrows extending from the view activity setting 212 indicate that the public account 208 can view activity by the public account 206 on the social networking system 106 such as content items shared by the public account 206 (e.g., images, videos, ephemeral content items, and the like), feedback (e.g., comments, likes, etc.) by the public account 206 on content items shared by other user accounts, and so forth.

The arrows extending from the follow setting 214 indicate that the public account 206 can follow the public account 208 on the social networking system 106 such that content items shared by the public account 208 (e.g., images, videos, ephemeral content items, and the like), appear in a content feed or story of the public account 206. Similarly, the arrows extending from the follow setting 214 indicate that the public account 208 can follow the public account 206 on the social networking system 106 such that content items shared by the public account 206 (e.g., images, videos, ephemeral content items, and the like), appear in a content feed or story of the public account 208. Therefore, the settings 204 provide few restrictions on how the public account 206 and the public account 208 interact with one another on the social networking system 106.

A second example 216 illustrates settings 218 that the account settings component 116 may use to control interactions between private and public accounts, such as a public account 220 and a private account 222, on the social networking system 106 of FIG. 1. In some examples, the private account may also be one of the different account types described herein, other than the secret account.

Similar to the discussion above, the settings 218 include a search setting 224, a view activity setting 226, and a follow setting 228. The arrows extending from the search setting 224 indicate that the public account 220 can search for the private account 222 and the social networking system 106 will provide search results to the public account 220 that include the private account 222. Similarly, the arrows extending from the search setting 224 indicate that the private account 222 can search for the public account 220, and the social networking system 106 will provide search results to the private account 222 that include the public account 220.

The view activity setting 226 may control what is visible to the public account 220 and/or the private account 222 prior to the public account 220 connecting with, or following, the private account 222, and/or prior to the private account 222 connecting with, or following, the public account 220. The view activity setting 226 has one arrow extending in the direction of the public account 220 from the private account 222. The arrow extending from the view activity setting 226 indicates that the private account 222 can view activity by the public account 220 on the social networking system 106 such as content items shared by the public account 220 (e.g., images, videos, ephemeral content items, and the like), feedback (e.g., comments, likes, etc.) by the public account 220 on content items shared by other user accounts, and so forth. However, the view activity setting 226 prevents the public account 220 from viewing activity by the private account on the social networking system 106, such as content items shared by the private account 222 (e.g., images, videos, ephemeral content items, and the like), feedback (e.g., comments, likes, etc.) by the private account 222 on content items shared by other user accounts, and so forth.

The arrow extending from the follow setting 228 in the direction of the public account 220 from the private account 222 indicates that the private account 222 can follow the public account 220 on the social networking system 106 such that content items shared by the public account 220 (e.g., images, videos, ephemeral content items, and the like), appear in a content feed or story of the private account 222. In some examples, follow setting 228 gives the private account 222 the ability to approve (or deny) requests to follow the private account 222 before another account can follow the private account. Therefore, the arrow extending from the follow setting 228 in the direction of the private account 222 from the public account 220 indicates that the public account 220 can request to follow the private account 222 on the social networking system 106. In response to the social networking system 106 receiving an indication from the private account 222 that the follow request has been approved, content items shared by the private account 222 (e.g., images, videos, ephemeral content items, and the like), appear in a content feed or story of the public account 220. Therefore, the settings 218 provide more restrictions on how the public account 220 and the private account 222 interact with one another on the social networking system 106 than the settings 204 for two public accounts.

A third example 230 illustrates settings 232 that the account settings component 116 may use to control interactions between secret and public accounts, such as a public account 234 and a secret account 236, on the social networking system 106 of FIG. 1. Similar to the discussion above, the settings 232 include a search setting 238, a view activity setting 240, and a follow setting 242. The arrow extending from the search setting 224 in the direction of the public account 234 from the secret account 236 indicates that the secret account 236 can search for the public account 234 and the social networking system 106 will provide search results to the secret account 236 that include the public account 234. However, the search setting 238 may prevent the secret account 236 from appearing in search results in response to a search input by public account 234 for the secret account 236. As discussed above, the search setting 238 may prevent the secret account 236 from appearing in search results even when the public account 234 inputs a search with an exact match to a username of the secret account, an exact match to a name of the user 102(1) provided in association with the secret account 236 and so forth.

The view activity setting 240 may control what is visible to the public account 234 and/or the secret account 236 prior to the public account 234 connecting with, or following, the secret account 236, and/or prior to the secret account 236 connecting with, or following, the public account 234. The view activity setting 240 has one arrow extending in the direction of the public account 234 from the secret account 236. The arrow extending from the view activity setting 240 indicates that the secret account 236 can view activity by the public account 234 on the social networking system 106 such as content items shared by the public account 234 (e.g., images, videos, ephemeral content items, and the like), feedback (e.g., comments, likes, etc.) by the public account 234 on content items shared by other user accounts, and so forth. However, the view activity setting 240 prevents the public account 234 from viewing activity by the secret account 236 on the social networking system 106, such as content items shared by the secret account 236 (e.g., images, videos, ephemeral content items, and the like), feedback (e.g., comments, likes, etc.) by the secret account 236 on content items shared by other user accounts, as described herein.

The arrow extending from the follow setting 242 in the direction of the public account 234 from the secret account 236 indicates that the secret account 236 can follow the public account 234 on the social networking system 106 such that content items shared by the public account 234 (e.g., images, videos, ephemeral content items, and the like), appear in a content feed or story of the secret account 236. As discussed herein, the secret account 236 may initiate invitations to interact with other user accounts, such as by sending an invite to interact with another user account, since the secret account 236 may not be discoverable (e.g., prevented by the search setting 238) by other user accounts on the social networking system 106. Therefore, the arrow extending towards the follow setting 242 in the direction of the public account 234 from the secret account 236 indicates that the secret account 236 invites the public account 234 to interact on the social networking system 106. Once the public account 234 has accepted the invitation from the secret account 236 to interact, content items shared by the secret account 236 (e.g., images, videos, ephemeral content items, and the like), may appear in a content feed or story of the public account 234. Therefore, the settings 232 provide more restrictions on how the public account 234 and the secret account 236 interact with one another on the social networking system 106 than the settings 204 for two public accounts, and/or the settings 218 for public and private accounts.

A fourth example 244 illustrates settings 246 that the account settings component 116 may use to control interactions between secret and private accounts, such as a private account 248 and a secret account 250, on the social networking system 106 of FIG. 1. Similar to the discussion above, the settings 246 include a search setting 252, a view activity setting 254, and a follow setting 256. The arrow extending from the search setting 252 in the direction of the private account 248 from the secret account 250 indicates that the secret account 250 can search for the private account 248 and the social networking system 106 will provide search results to the secret account 250 that include the private account 248. However, the search setting 252 may prevent the secret account 250 from appearing in search results in response to a search input by private account 248 for the secret account 250. As discussed above, the search setting 252 may prevent the secret account 250 from appearing in search results even when the private account 248 inputs a search with an exact match to a username of the secret account 250, an exact match to a name of the user 102(1) provided in association with the secret account 250, and so forth.

The view activity setting 254 may control what is visible to the private account 248 and/or the secret account 250 prior to the private account 248 connecting with, or following, the secret account 250, and/or prior to the secret account 250 connecting with, or following, the private account 248. As illustrated, the view activity setting 254 may not include any arrows extending towards the private account 248 and the secret account 250. For instance, the view activity setting 254 prevents the private account 248 from viewing activity by the secret account 250 on the social networking system 106, such as content items shared by the secret account 250 (e.g., images, videos, ephemeral content items, and the like), feedback (e.g., comments, likes, etc.) by the secret account 250 on content items shared by other user accounts, as described herein. Similarly, the view activity setting 254 may prevent the secret account 250 from viewing activity by the private account 248 on the social networking system 106, such as content items shared by the private account 248 (e.g., images, videos, ephemeral content items, and the like), feedback (e.g., comments, likes, etc.) by the private account 248 on content items shared by other user accounts, as described herein.

The arrow extending from the follow setting 256 in the direction of the private account 248 from the secret account 250 indicates that the secret account 250 can follow the private account 248 on the social networking system 106 such that content items shared by the private account 248 (e.g., images, videos, ephemeral content items, and the like), appear in a content feed or story of the secret account 250. Similar to the discussion above, the follow setting 256 may give the private account 248 the ability to approve (or deny) requests to follow the private account 248 before another account can follow the private account. Therefore, the arrow extending from the follow setting 256 in the direction of the private account 248 from the secret account 250 indicates that the secret account 250 can request to follow the private account 248 on the social networking system 106. In response to the social networking system 106 receiving an indication from the private account 248 that the follow request has been approved, content items shared by the private account 248 (e.g., images, videos, ephemeral content items, and the like), appear in a content feed or story of the secret account 250.

As discussed herein, the secret account 250 may initiate invitations to interact with other user accounts, such as by sending an invite to interact with another user account, since the secret account 250 may not be discoverable (e.g., prevented by the search setting 252) by other user accounts on the social networking system 106. Therefore, the arrow extending towards the follow setting 256 in the direction of the private account 248 from the secret account 250 indicates that the secret account 250 invites the private account 248 to interact on the social networking system 106. Once the private account 248 has accepted the invitation from the secret account 250 to interact, content items shared by the secret account 250 (e.g., images, videos, ephemeral content items, and the like), may appear in a content feed or story of the private account 248. Therefore, the settings 246 provide more restrictions on how the private account 248 and the secret account 250 interact with one another on the social networking system 106 than the settings 204 for two public accounts, the settings 218 for public and private accounts, and/or the settings 232 for public and secret accounts.

FIGS. 3-6 illustrate example processes for secret account creation and use on a social networking system using the techniques described herein. Various methods are described with reference to the example system of FIG. 1 and/or the settings of FIG. 2 for convenience and ease of understanding. However, the methods described are not limited to being performed using the systems of FIG. 1 or FIG. 7 and/or the settings of FIG. 2, and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

Figure 3:
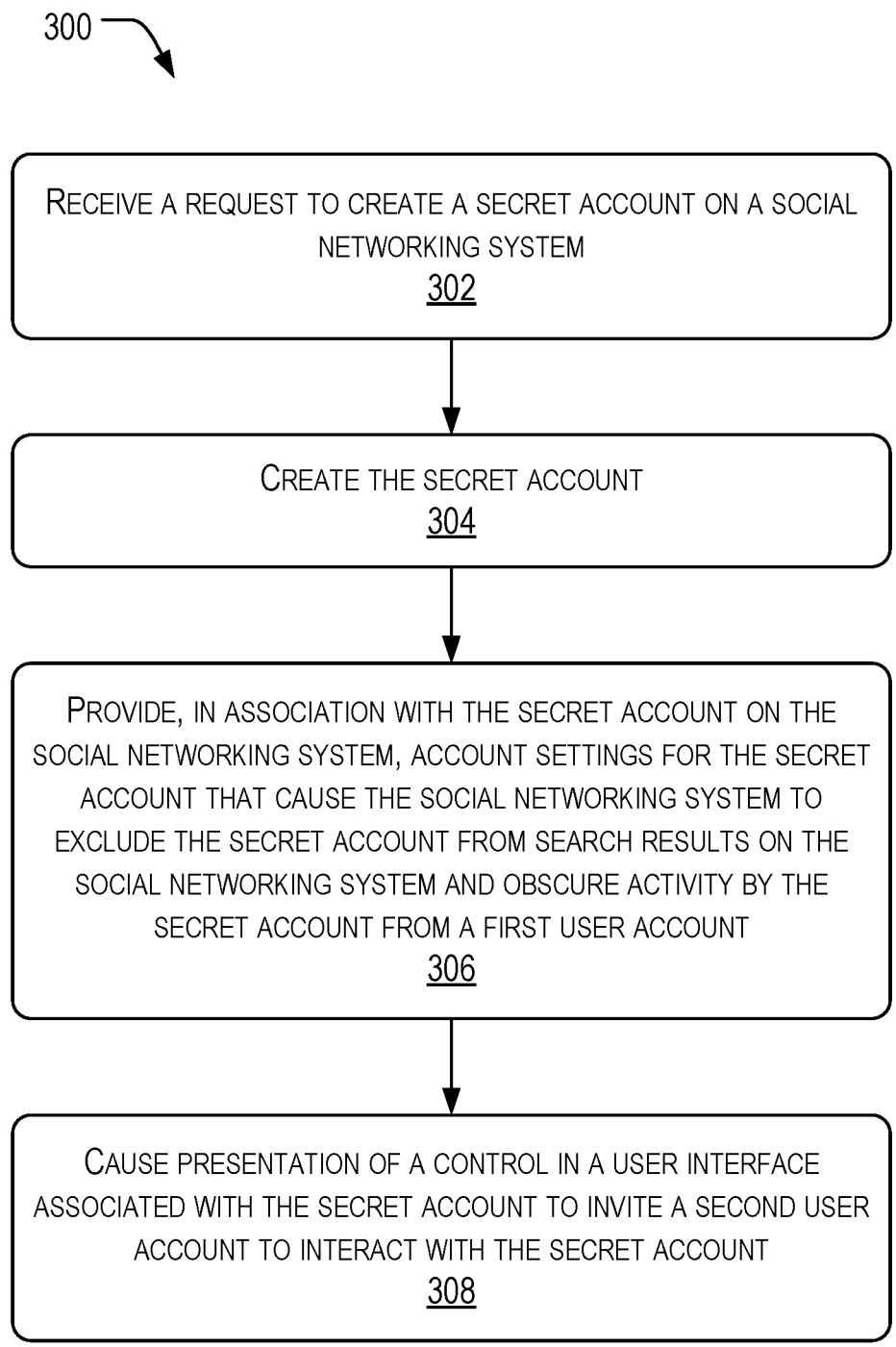
FIG. 3 illustrates a flowchart outlining an example method to create a secret account on a social networking system using the techniques described herein.

FIG. 3 illustrates an example process 300 to create a secret account on a social networking system using the techniques described herein.

An operation 302 includes receiving a request to create a secret account on a social networking system. In examples, the request may include a username to associate with the secret account that identifies activities (e.g., posts, comments, likes, etc.) performed by the user 102(1) on the social networking system 106 using the secret account. However, as described herein, the username associated with the secret account may be obscured in association with activities performed using the secret account on the social networking system 106 from other users 102(2)-102(n) who have not been invited to interact with the secret account.

An operation 304 includes creating the secret account on the social networking system. An operation 306 includes providing, in association with the secret account on the social networking system, account settings for the secret account that cause the social networking system to exclude the secret account from search results on the social networking system and obscuring activity by the secret account from a first user account. For example, the account settings component 116 may prevent the secret account from being discovered by other user accounts associated with the users 102(2)-102(n) if the other user accounts have not been invited by the secret account to interact on the social networking system 106. For example, the account settings component 116 may cause the social networking system 106 to exclude the secret account from search results on the social networking system 106, such as in response to a search performed by one of the other users 102(2) who has not been invited by the secret account to interact. Additionally, in some cases, the account settings component 116 may cause the social networking system 106 to prevent actions taken by the secret account, such as content items shared on the social networking system 106, feedback on content items shared on the social networking system 106, and the like from being visible to the user 102(2) associated with the first user account that has not been invited to interact with the secret account.

An operation 308 includes causing presentation of a control in a user interface associated with the secret account to invite a second user account to interact with the secret account. Accordingly, the secret account has control over which user accounts the secret account interacts with and are able to view activity by the secret account on the social networking system 106 via the invitation(s) to other user account(s). Since other user accounts may not be able to discover the presence of the secret account on the social networking system 106, the other user accounts may not have the ability to invite the secret account to interact.

Once another user account has accepted an invitation by the secret account to interact, the other user account may view activities by the secret account on the social networking system 106, such as content items shared by the secret account, feedback by the secret account on content items shared by other user accounts, and the like. Alternatively or additionally, once another user account has accepted an invitation by the secret account to interact, the other user account may interact with the secret account by sending direct messages to the secret account, tagging the secret account in content items, and so forth. Such interactions by the secret account with the invited user account, and activities by the secret account, may be obscured from other user accounts on the social networking system 106 that have not been invited to interact with the secret account.

Figure 4:
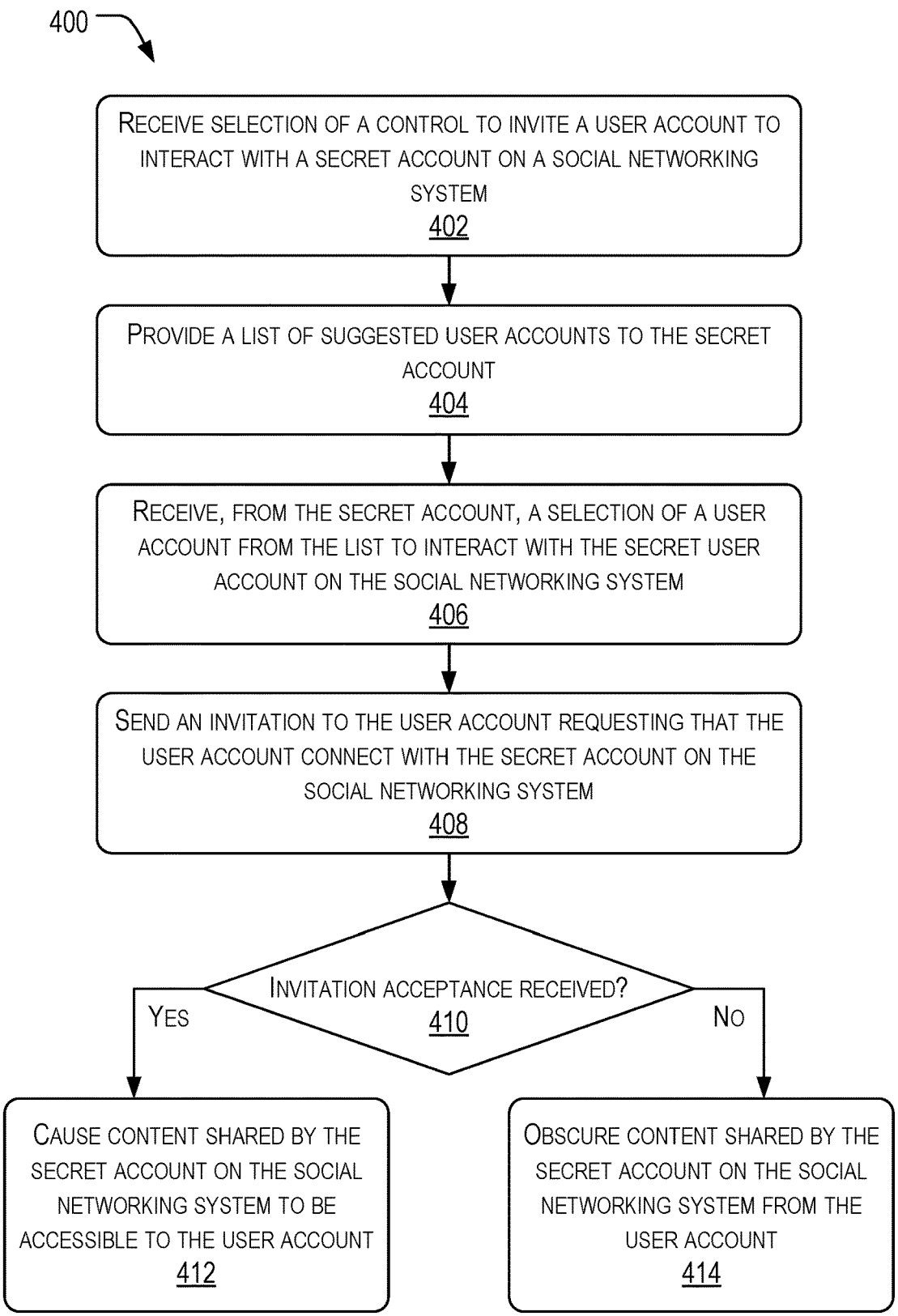
FIG. 4 illustrates a flowchart outlining an example method to invite user accounts to interact with a secret account on a social networking system using the techniques described herein.

FIG. 4 illustrates an example process 400 to invite user accounts to interact with a secret account on a social networking system using the techniques described herein. An operation 402 includes receiving a selection of a control to invite user accounts to interact with a secret account on a social networking system. In some examples, the control may be presented in a user interface to the user 102(1) during and/or following creation of the secret account on the social networking system 106, to assist the user 102(1) with finding connections on the social networking system 106.

An operation 404 includes providing a list of suggested user accounts to the secret account. In some examples, the social networking system 106 may present suggestions of other user accounts to follow to the secret account, such as a user account that shares common followers with the secret account, connections that the user 102(1) has with a different account (e.g., a public account or private account) on the social networking system 106, a trending user account, a user account that shares content items in a multi-author story that the secret account also shares content items with, and so forth. Alternatively or additionally, the social networking system 106 may leverage another application on the computing device 104(1) that is independent of the social network application or web browser used to access the social networking system, such as a contacts or phone book application, a messaging application (e.g., SMS messaging, WhatsApp®, Facebook Messenger®, Slack®, etc.), or the like to suggest other users to connect with. For instance, the social networking system 106 may use contacts in the other application to suggest users (who may or may not have an account on the social networking system 106) for the secret account to interact with on the social networking system 106.

An operation 406 includes receiving, from the secret account, a selection of a user account from the list to interact with the secret account on the social networking system. Responsive to receiving the selection, an operation 408 includes sending an invitation to the user account requesting that the user account connect with the secret account on the social networking system. In some examples, the social networking system 106 may send the invitation to the user account (e.g., a user account associated with the user 102(*n*)) via the social networking system 106, such that user 102(*n*) receives the invitation in the social network application and/or a web browser used to access the social networking system 106 on the computing device 104(*m*). Alternatively or additionally, the social networking system 106 may leverage another application that is independent of the social network application and/or web browser on the computing device 104(1) to send the invitation, such as an SMS messaging application, email application, and/or an application that was used to access contacts of the user 102(1) described above. In some cases, the social networking system 106 may provide a link for the user to accept the invitation as part of the invitation, where the link directs the user 102(*n*) to the social network application or a web page in a browser to access the social networking system 106.

An operation 410 determines whether the invitation has been accepted by the user. For instance, when the invitation is sent via the social networking system 106, the invitation may be accepted by the user 102(*n*) by selecting an "accept invitation" control in a user interface. Alternatively or additionally, when the invitation is sent via an application that is independent of the social networking system 106, the social networking system 106 may receive an indication that the invitation has been accepted by the user 102(*n*) selecting the link and being directed to the social networking system 106.

If the social networking system 106 determines that an invitation acceptance has been received (e.g., "Yes" at operation 410), an operation 412 includes causing content shared by the secret account on the social networking system to be accessible to the user account. For example, acceptance of the invitation may cause the user account to follow the secret account, such that content items shared by the secret account (e.g., images, videos, ephemeral content items, and the like), appear in a content feed or story of the user account. Alternatively or additionally, acceptance of the invitation may enable the user account to receive search results that include the secret account, to view a profile page of the secret account (e.g., including content items shared by the secret account prior to accepting the invitation), send direct messages to the secret account, and so forth.

If the social networking system 106 determines that an invitation acceptance has not been received, however (e.g., "No" at operation 410), an operation 414 includes obscuring content shared by the secret account on the social networking system from the user account. For instance, content items shared by the secret account (e.g., images, videos, ephemeral content items, and the like), may not appear in a content feed or story of the user account without acceptance of the invitation. Further, in some examples, the user account may not be able to receive search results that include the secret account, to view a profile page of the secret account (e.g., including content items shared by the secret account prior to accepting the invitation), send direct messages to the secret account, and so forth without acceptance of the invitation.

Figure 5:
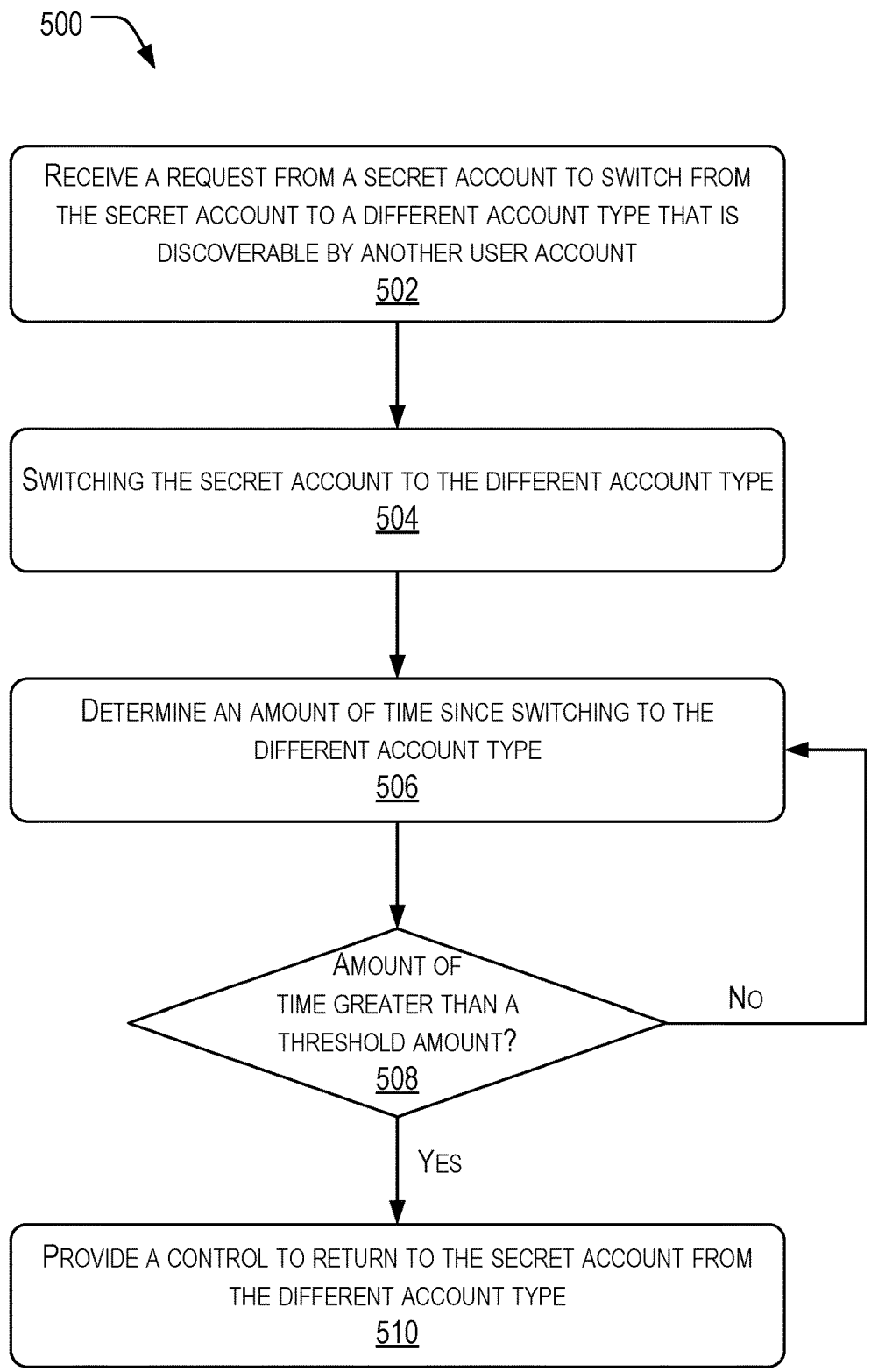
FIG. 5 illustrates a flowchart outlining an example method to limit switching between a secret account and a different account type on a social networking system using the techniques described herein.

FIG. 5 illustrates an example process 500 to limit switching between a secret account and a different account type on a social networking system using the techniques described herein.

An operation 502 includes receiving a request from a secret account to switch from the secret account to a different account type that is discoverable by another user account on a social networking system. The different account type may be a public account, a private account, or some other account type that is discoverable by other user accounts (e.g., by searching) on the social networking system 106. Responsive to receiving the request, an operation 504 includes switching the secret account to the different account type. In some examples, the social networking system 106 may store a time at which the switch to the different account type was made.

An operation 506 includes determining an amount of time since switching to the different account type. An operation 508 includes determining whether the amount of time since switching to the different account type is greater than a threshold amount of time. In examples, the social networking system 106 may determine whether a predetermined amount of time (e.g., one day, three days, one week, etc.) has passed since the secret account has switched to the different account type.

If the social networking system 106 determines that the amount of time since switching to the different account type is greater than the threshold amount of time (e.g., "Yes" at operation 508), an operation 510 includes providing a control to return to the secret account from the different account type. For instance, the control may appear and/or become selectable in a settings menu that the user 102(1) may select account settings for the social networking system. On the other hand, if the social networking system 106 determines that the amount of time since switching to the different account type is less than the threshold amount of time (e.g., "No" at operation 508), the process 500 may return to operation 506, in which the social networking system 106 continues to determine an amount of time since switching to the different account type. Once the threshold amount of time has passed, the social networking system 106 may provide the control, that when selected by the user 102(1), causes the different account type to return to the secret account type. In this way, the social networking system 106 may prevent malicious switching between account types.

Figure 6:
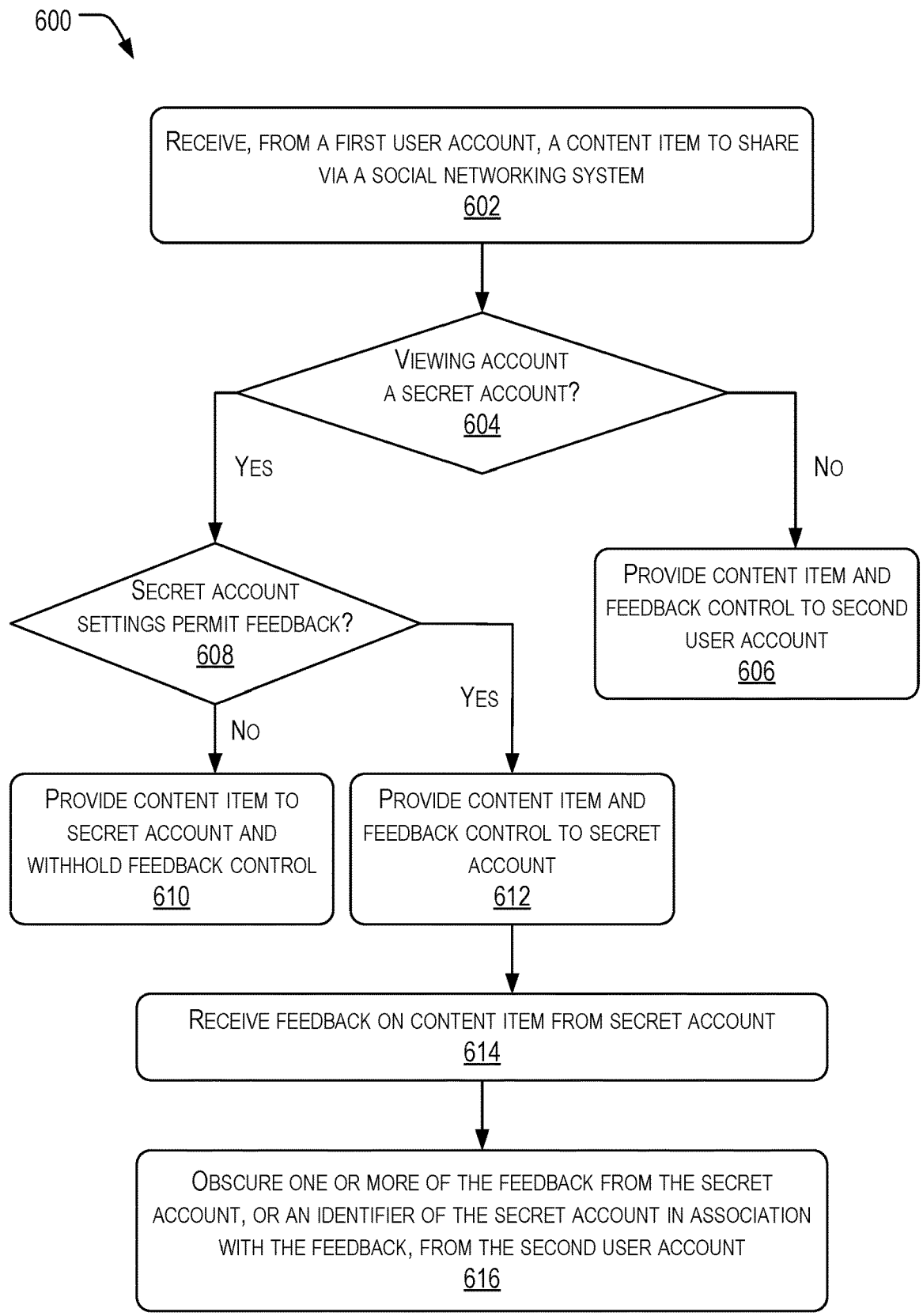
FIG. 6 illustrates a flowchart outlining an example method to control how feedback by a secret account is displayed to other user accounts on a social networking system using the techniques described herein.

FIG. 6 illustrates an example process 600 to control how feedback by a secret account is displayed to other user accounts on a social networking system using the techniques described herein.

An operation 602 includes receiving, from a first user account, a content item to share via a social networking system. In some examples, the first user account is an account type that is discoverable on the social networking system 106, such as a public account type or a private account type. Examples are also considered in which the first user account is a secret account.

An operation 604 includes determining whether a viewing account of the content item shared by the first user account is a secret account. For instance, a secret account may view content items shared by a public account, regardless of whether the secret account follows the public account. In some cases, a secret account may not be able to view content items shared by a private account unless the secret account has been approved by the private account to follow the private account.

If the social networking system 106 determines that the viewing account is not a secret account (e.g., "No" at operation 604), the process may proceed to an operation 606 that includes providing the content item and a feedback control to a second user account (e.g., the viewing user account). For example, the feedback control may enable the second user account viewing the content item to comment on the content item, like the content item, reshare the content item, and so forth.

If the social networking system 106 determines that the viewing account is a secret account (e.g., "Yes" at operation 604), the process may proceed to an operation 608 that includes determining whether account settings associated with the secret account permit the secret account to provide feedback on content items shared by other user accounts. As discussed above, allowing a secret account to provide feedback on content items shared by other user accounts may cause the secret account to be discovered by user accounts that the secret account has not invited to interact with on the social networking system 106. Therefore, based on determining that the secret account settings do not permit the secret account to provide feedback on content items shared by other user accounts, (e.g., "No" at operation 608), the process 600 may proceed to an operation 610 that includes providing the content item to the secret account while withholding a feedback control. In examples, the social networking system 106 may disable feedback controls, such as like and comment controls, when the secret account settings do not permit feedback.

Based on determining that the secret account settings do permit the secret account to provide feedback on content items shared by other user accounts, (e.g., "Yes" at operation 608), the process 600 may proceed to an operation 612 that includes providing the content item and the feedback control to the secret account. Thus, the social networking system 106 may enable feedback controls, such as like and comment controls, when the secret account settings do permit the secret account to provide feedback.

An operation 614 includes receiving feedback on the content item from the secret account. In some examples, the social networking system 106 may receive feedback, such as a like or comment, on the content item from the secret account. The social networking system 106 may determine if the secret account has invited the first user account to connect on the social networking system 106 and the first user account has accepted the invitation, as described above. If the first user account has accepted the invitation to connect from the secret account, the social networking system 106 may share the feedback provided by the secret account with the first user account that shared the content item.

An operation 616 includes obscuring one or more of the feedback from the secret account, or an identifier of the secret account in association with the feedback, from the second user account. For instance, the secret account may not have invited the second user account to interact on the social networking system 106. The social networking system 106 may determine that the secret account is not connected to the second user account, and thus may obscure activity, such as the feedback, by the secret account from the second user account. In some cases, the social networking system 106 may prevent the second user account from viewing the feedback (e.g., the like or the comment) by the secret account. The social networking system 106 may, alternatively or additionally, obscure an identifier of the secret account such as a username or profile picture by blurring, redacting, camouflaging, blocking out, omitting, or the like the username and/or profile picture.

Example System and Device

Figure 7:
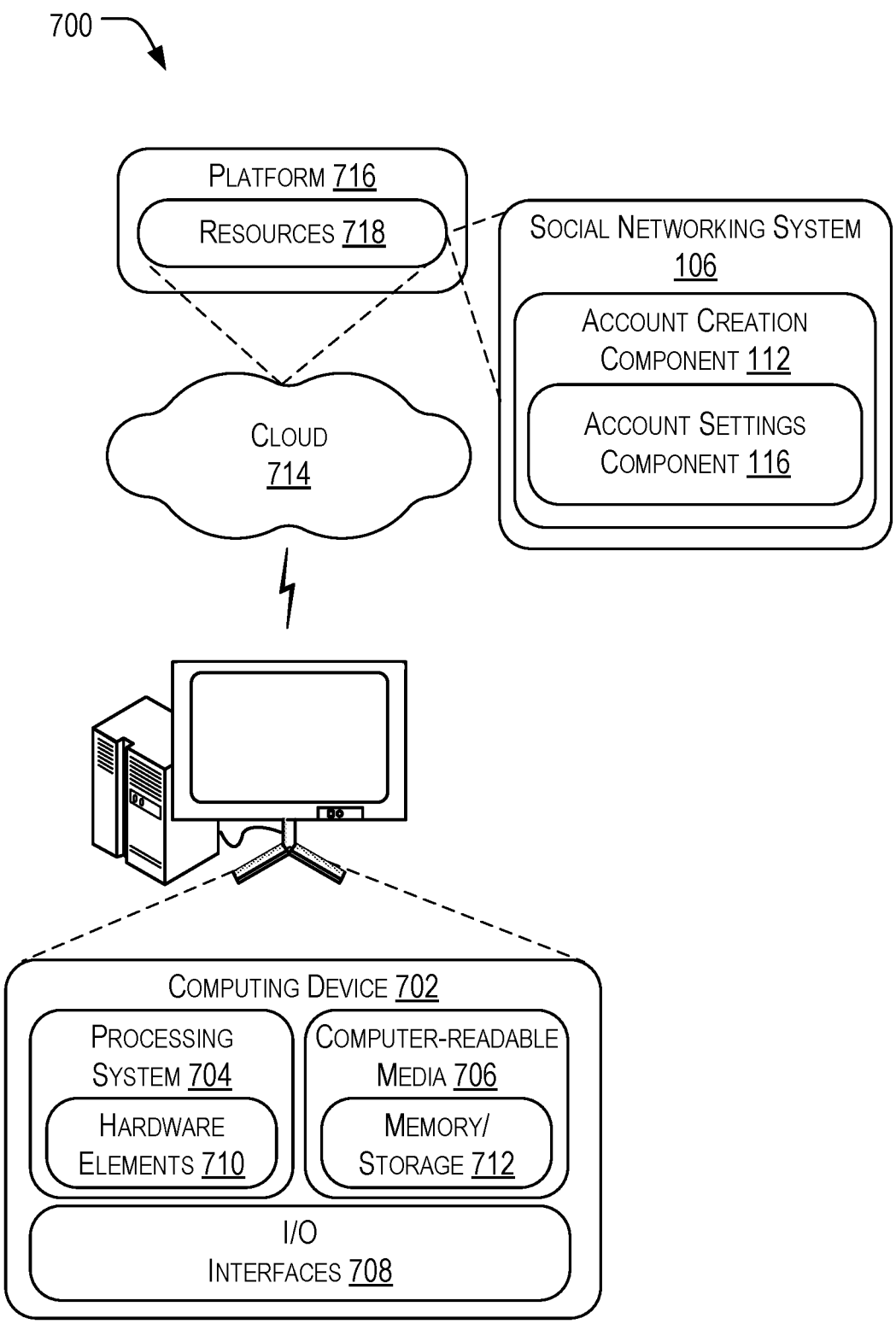
FIG. 7 is an example system and device that is usable to implement the techniques described herein.

FIG. 7 illustrates an example system generally at 700 that includes an example computing device 702 that is representative of one or more computing systems and/or devices that may implement the various techniques described herein. This is illustrated through inclusion of the account creation component 112 and the account settings component 116. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 702. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 702, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 710 and computer-readable media 706 are representative of modules, programmable device logic and/or device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also be scalable to provide a corresponding level of scale to encountered demand for the resources 718 that are implemented via the platform 716. Accordingly, in an interconnected device embodiment, implementation of functionality described herein may be distributed throughout multiple devices of the system 700. For example, the functionality may be implemented in part on the computing device 702 as well as via the platform 716 which may represent a cloud computing environment 714.

The example systems and methods of the present disclosure overcome various deficiencies of known prior art devices. Other embodiments of the present disclosure will be apparent to those skilled in the art from consideration of the specification and practice of the disclosure contained herein. It is intended that the specification and examples be considered as example only, with a true scope and spirit of the present disclosure being indicated by the following claims.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving a first request to create a secret account on a social networking system;
creating, by the social networking system, the secret account;
providing, in association with the secret account on the social networking system, account settings for the secret account, the account settings causing the social networking system to at least:
exclude the secret account from search results on the social networking system, and
obscure activity by the secret account on the social networking system from a first user account;
causing presentation of a first control in a user interface associated with the secret account to invite a second user account to interact with the secret account;
receiving a second request from the secret account to switch from the secret account to a different account type, the different account type being discoverable by the first user account;
switching the secret account to the different account type;
determining that a predetermined amount of time has passed since the secret account switched to the different account type; and
providing a second control to return to the secret account from the different account type responsive to determining that the predetermined amount of time has passed.

2. The method of claim 1, further comprising:
receiving, from the first user account, a search input comprising a username associated with the secret account or a name supplied by a user that requested to create the secret account; and
providing, based at least in part on the search input, the search results to the first user account that exclude the secret account.

3. The method of claim 1, wherein the account settings further cause the social networking system to exclude the secret account from suggestions of accounts to follow that are presented to the first user account.

4. The method of claim 1, further comprising:
receiving a first selection of the first control to invite the second user account to interact with the secret account;
providing a list of suggested user accounts to the secret account, the list including the second user account;
receiving, from the secret account, a second selection of the second user account to interact with the secret account;
sending an invitation to the second user account requesting that the second user account connect with the secret account on the social networking system;
receiving an acceptance of the invitation from the second user account; and
causing content shared by the secret account on the social networking system to be accessible to the second user account.

5. The method of claim 1, wherein the first request is received from a first application associated with the social networking system, the method further comprising:
receiving a selection of the control to invite the second user account to interact with the secret account;
sending, from a second application independent of the first application, an invitation to the second user account requesting that the second user account connect with the secret account on the first application;
receiving, by the social networking system, an acceptance of the invitation from the second user account; and
causing content shared by the secret account on the social networking system to be accessible to the second user account on the first application.

6. The method of claim 1, further comprising providing a visual indicator, in the user interface associated with the secret account, that the secret account is currently active.

7. The method of claim 1, the method further comprising:
receiving, from the second user account, a content item to share via the social networking system;
providing the content item to the first user account with a third control that, when selected, causes the first user account to provide feedback to the second user account associated with the content item; and
providing the content item to the secret account without the third control.

8. The method of claim 1, further comprising:
receiving, from the secret account, feedback on a content item shared by the second user account;
providing the feedback to the second user account; and
obscuring one or more of the feedback from the first user account, or an identifier of the secret account in association with the feedback from the first user account.

9. The method of claim 1, further comprising:
receiving, from the second user account, a content item to be shared by the second user account with the first user account, the content item including a tag that identifies the secret account; and
obscuring the tag that identifies the secret account from the first user account by one or more of:
displaying the content item without the tag to the first user account; or
obfuscating an identifier of the secret account in the tag as part of the content item when displayed to the first user account.

10. A system comprising:
one or more processors; and
one or more computer-readable storage media storing instructions that, when executed by the one or more processors, cause the one or more processors to perform operations comprising:
receiving a first request to create a secret account on a social networking system;
creating, by the social networking system, the secret account;
providing, in association with the secret account on the social networking system, account settings for the secret account, the account settings causing the social networking system to at least:
exclude the secret account from search results on the social networking system, and
obscure activity by the secret account on the social networking system from a first user account;
causing presentation of a first control in a user interface associated with the secret account to invite a second user account to interact with the secret account;
receiving a second request from the secret account to switch from the secret account to a different account type, the different account type being discoverable by the first user account;
switching the secret account to the different account type;

determining that a predetermined amount of time has passed since the secret account from the different account type responsive to determining that the predetermined amount of time has passed; and providing a second control to return to the secret account from the different account type responsive to determining that the predetermined amount of time has passed.

11. The system of claim 10, the operations further comprising:

receiving, from the first user account, a search input comprising a username associated with the secret account or a name supplied by a user that requested to create the secret account; and providing, based at least in part on the search input, the search results to the first user account that exclude the secret account.

12. The system of claim 10, wherein the account settings further cause the social networking system to exclude the secret account from suggestions of accounts to follow that are presented to the first user account.

13. The system of claim 10, the operations further comprising:

receiving a first selection of the first control to invite the second user account to interact with the secret account;

providing a list of suggested user accounts to the secret account, the list including the second user account;

receiving, from the secret account, a second selection of the second user account to interact with the secret account;

sending an invitation to the second user account requesting that the second user account connect with the secret account on the social networking system;

receiving an acceptance of the invitation from the second user account; and causing content shared by the secret account on the social networking system to be accessible to the second user account.

14. The system of claim 10, wherein the first request is received from a first application associated with the social networking system, the operations further comprising:

receiving a selection of the first control to invite the second user account to interact with the secret account;

sending, from a second application independent of the first application, an invitation to the second user account requesting that the second user account connect with the secret account on the first application;

receiving, by the social networking system, an acceptance of the invitation from the second user account; and causing content shared by the secret account on the social networking system to be accessible to the second user account on the first application.

15. The system of claim 10, the operations further comprising:

receiving, from the second user account, a content item to share via the social networking system;

providing the content item to the first user account with a third control that, when selected, causes the first user account to provide feedback to the second user account associated with the content item; and providing the content item to the secret account without the third control.

16. The system of claim 10, the operations further comprising:

receiving, from the second user account, a content item to be shared by the second user account with the first user account, the content item including a tag that identifies the secret account; and obscuring the tag that identifies the secret account from the first user account by one or more of:

displaying the content item without the tag to the first user account; or obfuscating an identifier of the secret account in the tag as part of the content item when displayed to the first user account.

17. One or more computer-readable storage media storing instructions, that when executed by one or more processors, cause the one or more processors to perform operations comprising:

receiving a first request to create a secret account on a social networking system;

creating, by the social networking system, the secret account;

providing, in association with the secret account on the social networking system, account settings for the secret account, the account settings causing the social networking system to at least:

exclude the secret account from search results on the social networking system, and obscure activity by the secret account on the social networking system from a first user account;

causing presentation of a first control in a user interface associated with the secret account to invite a second user account to interact with the secret account;

receiving a second request from the secret account to switch from the secret account to a different account type, the different account type being discoverable by the first user account;

switching the second account to the different account type;

determining that a predetermined amount of time has passed since the secret account switched to the different account type; and providing a second control to return the secret account from the different account type responsive to determining that the predetermined amount of time has passed.

18. The one or more computer-readable storage media storing instructions of claim 17, the operations further comprising:

receiving, from the second user account, a content item to share via the social networking system;

providing the content item to the first user account with a third control that, when selected, causes the first user account to provide feedback to the second user account associated with the content item; and providing the content item to the secret account without the third control.

19. The one or more computer-readable storage media storing instructions of claim 17, the operations further comprising:

receiving, from the secret account, feedback on a content item shared by the second user account;

providing the feedback to the second user account; and obscuring one or more of the feedback from the first user account, or an identifier of the secret account in association with the feedback from the first user account.

20. The one or more computer-readable storage media storing instructions of claim 17, the operations further comprising:

receiving, from the second user account, a content item to be shared by the second user account with the first user account, the content item including a tag that identifies the secret account; and obscuring the tag that identifies the secret account from the first user account by one or more of:
  displaying the content item without the tag to the first user account; or
  obfuscating an identifier of the secret account in the tag as part of the content item when displayed to the first user account.

* * * * *